United States Patent
Dudar (10) Patent No.: US 11,649,760 B1
(45) Date of Patent: May 16, 2023

(54) METHOD AND SYSTEM FOR DIAGNOSING AN ENGINE COOLANT PUMP

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/645,235

(22) Filed: Dec. 20, 2021

(51) Int. Cl.
| | | |
|---|---|---|
| *F01P 11/16* | (2006.01) | |
| *F01P 5/10* | (2006.01) | |
| *G05B 19/416* | (2006.01) | |
| *G01K 3/00* | (2006.01) | |

(52) U.S. Cl.
CPC .............. *F01P 11/16* (2013.01); *F01P 5/10* (2013.01); *G01K 3/005* (2013.01); *G05B 19/416* (2013.01); *G05B 2219/37371* (2013.01)

(58) Field of Classification Search
CPC .......... F01P 11/16; F01P 5/10; F01P 2025/08; F01P 2025/30; F01P 2025/32; F01P 2025/34; F01P 2025/36; G01K 3/005; G05B 19/416; G05B 2219/37371
See application file for complete search history.

(56) References Cited

U.S. PATENT DOCUMENTS

| | | |
|---|---|---|
| 8,224,517 B2 | 7/2012 | Eser et al. |
| 8,620,516 B2 | 12/2013 | Anilovich et al. |
| 8,915,127 B2 | 12/2014 | Graf |
| 8,978,598 B2 * | 3/2015 | Iwai .................. F01P 11/16 |
| | | 123/41.15 |
| 10,054,030 B2 | 8/2018 | Duan et al. |
| 2008/0148829 A1 | 6/2008 | Bohman |

OTHER PUBLICATIONS

Schmidt, K., "First fully variable coolant pump for commercial vehicles," PresseBox Website, Available Online at http://www.rheinmetall-automotive.com, Sep. 22, 2010, 3 pages.

* cited by examiner

*Primary Examiner* — Jacob M Amick
(74) *Attorney, Agent, or Firm* — Vincent Mastrogiacomo; McCoy Russell LLP (57) ABSTRACT

Methods and systems to diagnose operation of an engine coolant pump are presented. In one example, the engine coolant pump is operated while an engine is stopped so that operation of the coolant pump may not effect engine operation. The engine coolant pump may be operated at different speeds to assess engine coolant pump operation.

19 Claims, 6 Drawing Sheets

METHOD AND SYSTEM FOR DIAGNOSING AN ENGINE COOLANT PUMP

FIELD

The present application relates to methods and systems for diagnosing operation of an engine coolant pump.

BACKGROUND/SUMMARY

An internal combustion engine may include a coolant pump to circulate coolant between a heat producing engine and a heat extracting radiator. Engine coolant pumps typically operate at a speed that was dependent upon engine speed. However, an engine may generate substantially less waste heat when the engine is operated at a low speed, such as engine idle speed. Engine coolant pumps that rotate at speeds that are dependent on engine speed may pump more coolant than may be needed to be pumped when engine speed is low. Consequently, engine coolant pumps may exhibit higher parasitic losses than may be desired when an engine is operated at idle speed. One way to reduce engine coolant pump losses may be to install an engine coolant pump that is electrically driven. An electrically driven engine coolant pump may be driven at speeds that are not mechanically dependent on engine speed. As a result, electrically driven engine coolant pumps may be more efficient than mechanically driven engine coolant pumps. However, it may not be desirable to assess high speed and low speed functionality of an electrically driven engine coolant pump when an engine is running because over cooling or under cooling the engine may lead to higher engine emissions and/or increasing the possibility of engine degradation. Therefore, it may be desirable to provide a way of diagnosing operation of an electrically driven engine coolant pump in a way that may not effect engine operation.

The inventor herein has recognized that operation of an engine coolant pump may affect engine operation. Therefore, the inventor has developed a method for diagnosing operation of an engine coolant pump, comprising: rotating the engine coolant pump at a first speed via a controller in response to an engine not rotating; monitoring output of a temperature sensor while operating the engine coolant pump at the first speed; and comparing output of the temperature sensor to a predetermined temperature response.

By rotating an engine coolant pump when an engine is not rotating, it may be possible to diagnose operation of an engine coolant pump without impacting engine operation. In addition, the engine coolant pump may be operated at lower and higher speeds to verify the engine coolant pump's range of operation without affecting engine operation.

The present approach may provide several advantages. In particular, the approach may enable an engine coolant pump to be evaluated over its operating range without affecting engine emissions. Further, the approach may be performed without impacting vehicle drivability. In addition, the approach provides for mitigating actions in situations where engine coolant pump degradation may be determined.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
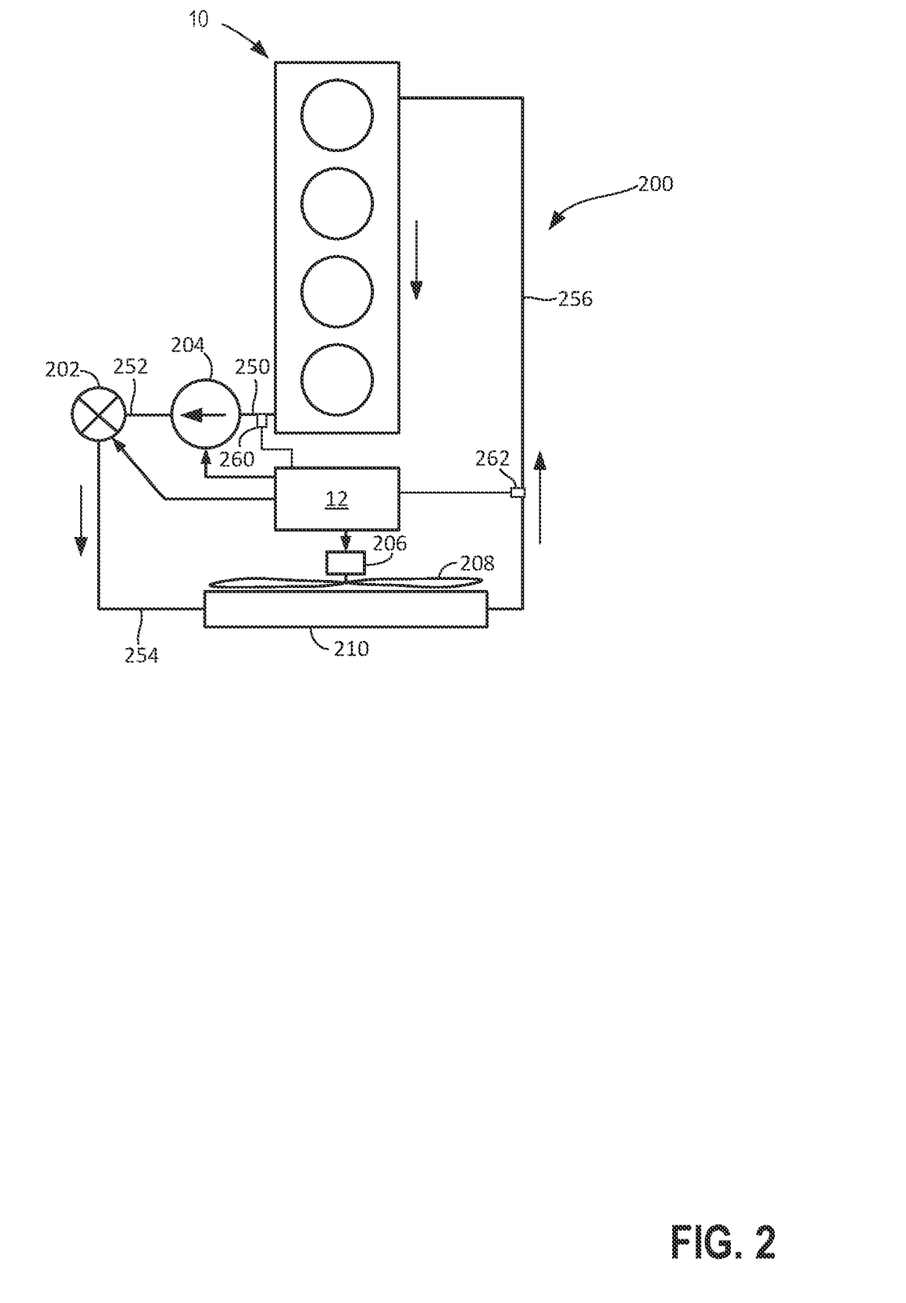
FIG. 2 shows an example engine cooling system.
Figure 3:
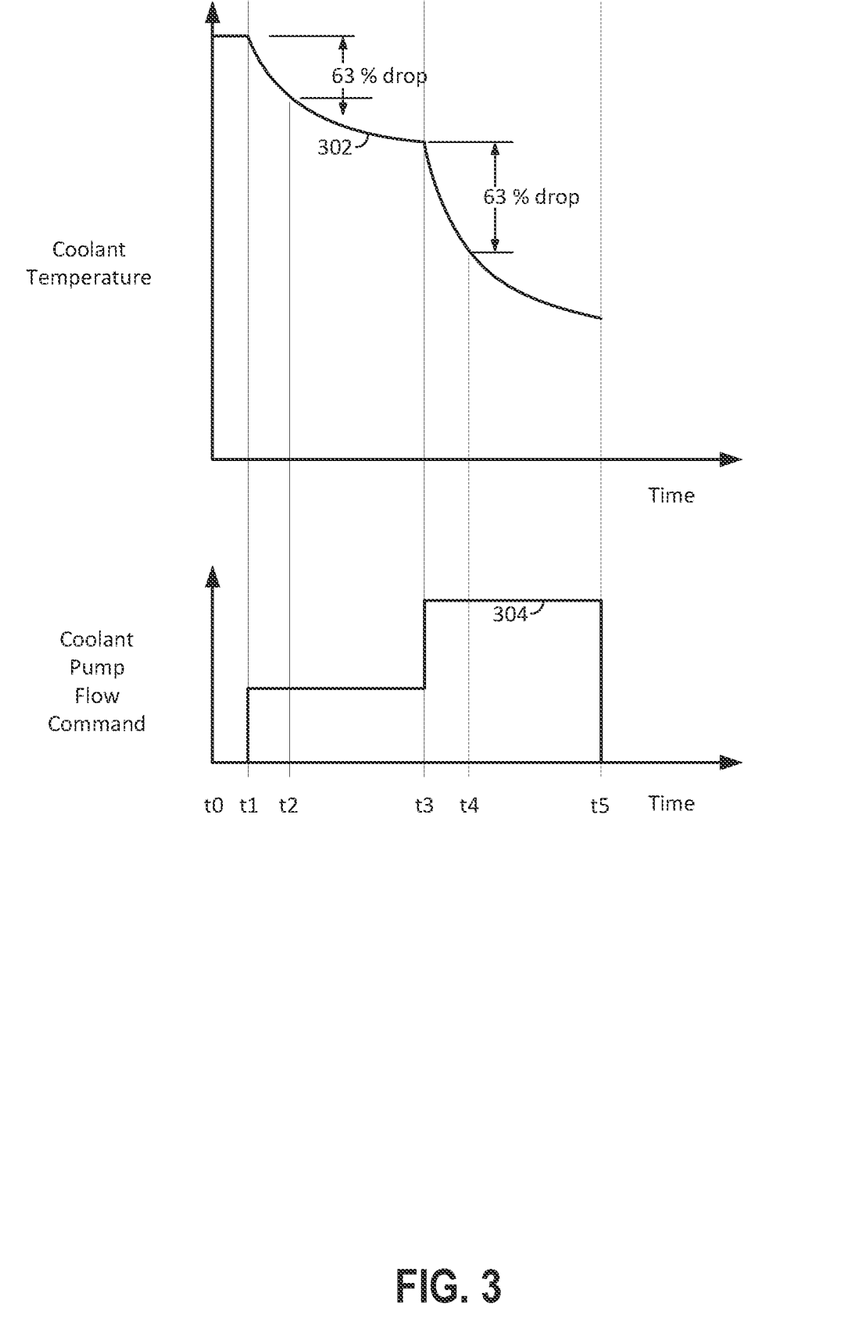
FIGS. 3-5 show plots of example engine cooling system responses according to the method of FIG. 6.
Figure 4:
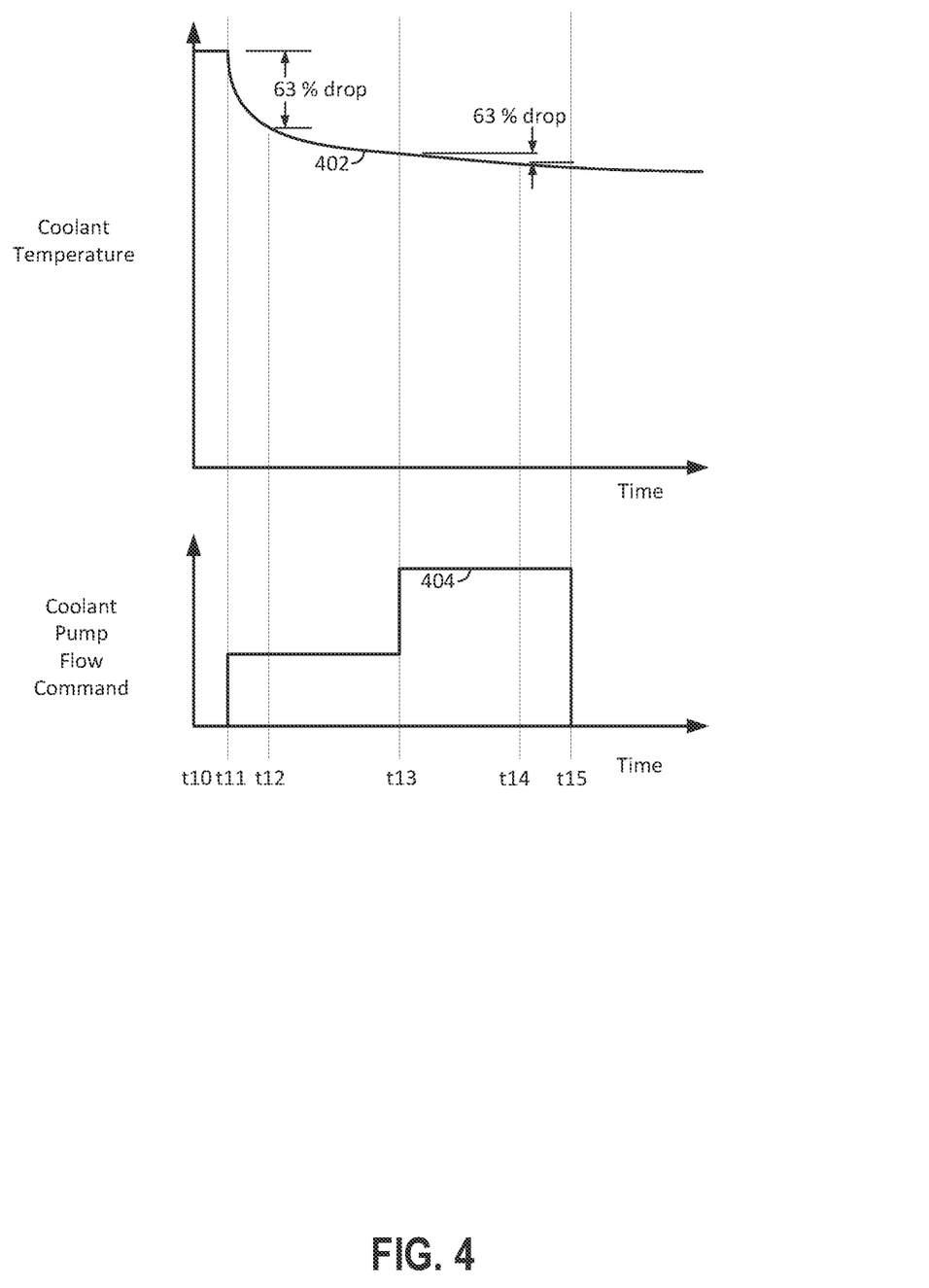
Figure 5:
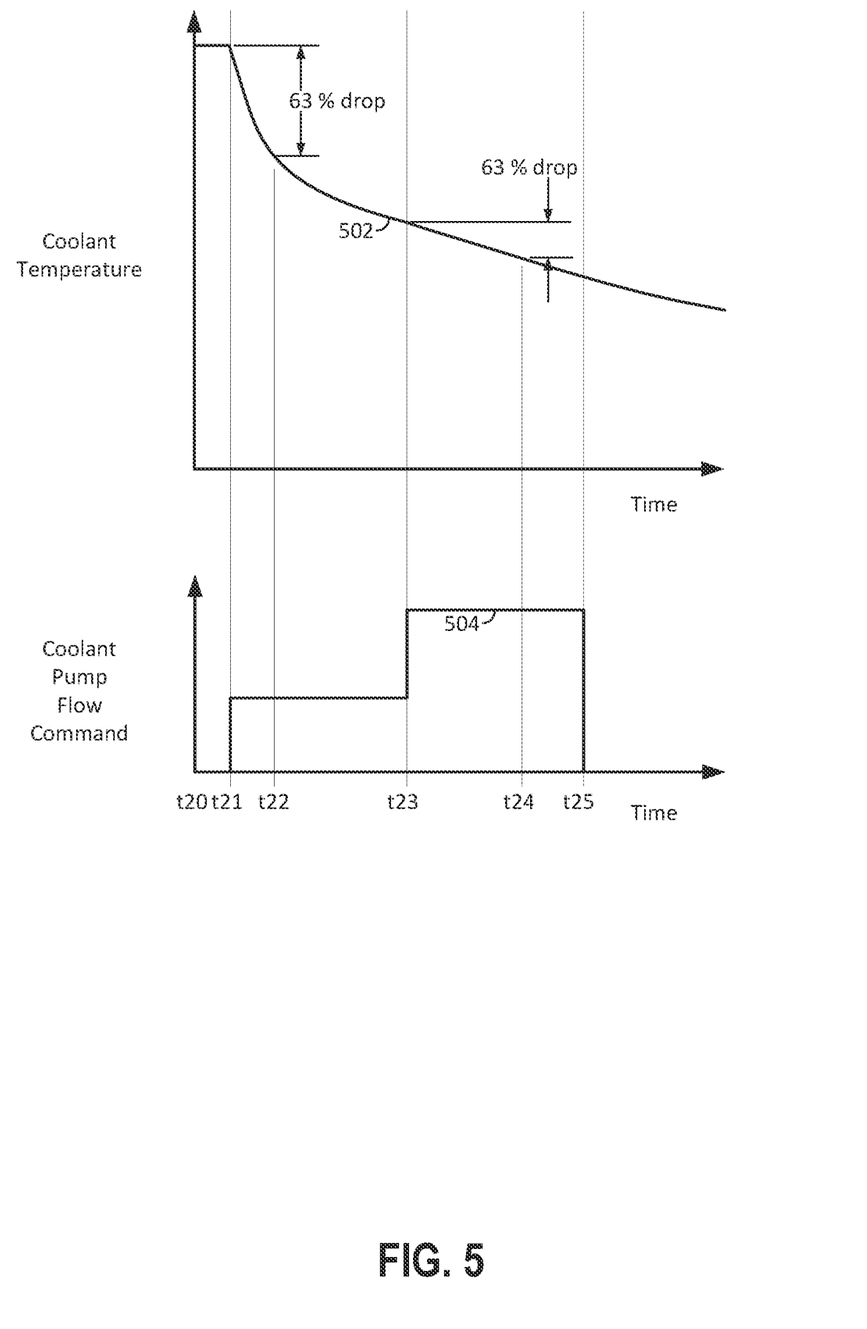

The following description relates to systems and methods for diagnosing operation of an engine coolant pump. The engine coolant pump may circulate engine coolant between an engine and a radiator or heat exchanger. In one example, the engine coolant pump may be a variable speed pump. The engine coolant pump may be incorporated into a vehicle of the type shown in FIG. 1, or other known vehicle types. The engine coolant pump may be part of an engine cooling system as shown in FIG. 2. The engine cooling circuit may respond as shown in FIGS. 3-5 according to the method of FIG. 6. The method of FIG. 6 may diagnose operation of an engine coolant pump without affecting engine operation.

Figure 1:
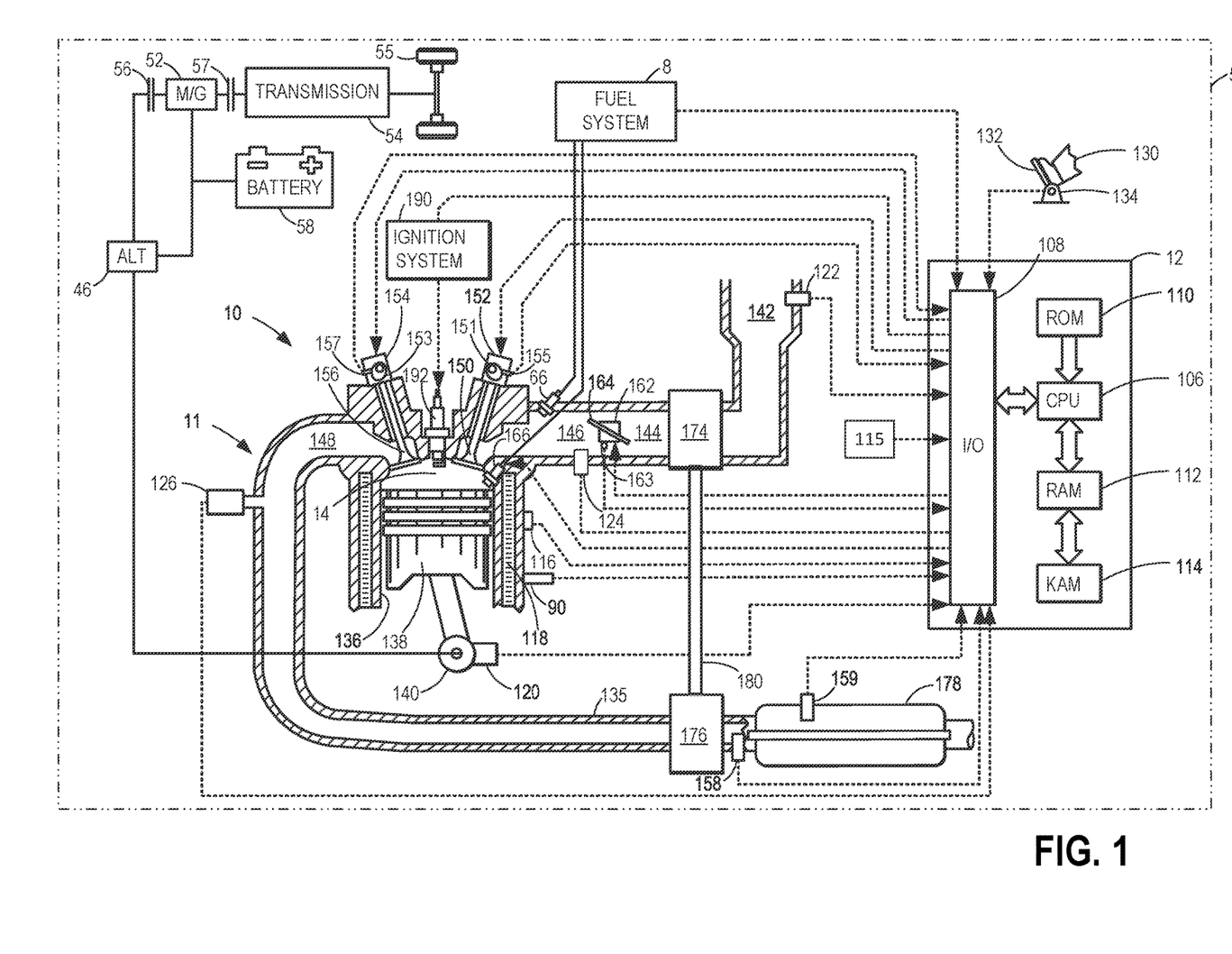
FIG. 1 shows a schematic depiction of an engine system of a vehicle.

Turning now to the figures, FIG. 1 depicts an example of a cylinder 14 of an internal combustion engine 10, which may be included in a vehicle 5. Engine 10 may be a variable displacement engine (VDE), as described further below. Engine 10 may be controlled at least partially by a control system, including a controller 12, and by input from a human vehicle operator 130 via a driver demand pedal 132. In this example, driver demand pedal 132 includes a pedal position sensor 134 for generating a proportional pedal position signal. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of vehicle 5 via a transmission 54, as further described below.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 57 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

Engine 10 may be rotated via electric machine 52 during starting or when engine 10 is operated as an air pump.

Alternatively, a starter motor (not shown) may rotate engine 10 during starting or when engine 10 is operated as an air pump. The starter motor may engage crankshaft 140 via a flywheel (not shown).

The powertrain may be configured in various manners, including as a parallel, a series, or a series-parallel hybrid vehicle. Further, engine 10 and electric machine 52 may be coupled via a gear set instead of a clutch in some configurations. In electric vehicle examples, a system battery 58 may be a traction battery that delivers electrical power to electric machine 52 to provide torque to vehicle wheels 55. In some examples, electric machine 52 may also be operated as a generator to provide electrical power to charge system battery 58, for example, during a braking operation. It will be appreciated that in other examples, including non-electric vehicle examples, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor. In still other examples, engine 10 may not be provided with a boosting device, such as when engine 10 is a naturally aspirated engine.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1, or may be alternatively provided upstream of compressor 174. A position of throttle 162 may be communicated to controller 12 via a signal from a throttle position sensor.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO sensor. Emission control device 178 may be a three-way catalyst, a NOx trap, various other emission control devices, or combinations thereof. In the example of FIG. 1, emission control device 178 may be a three-way catalyst or an oxidation catalyst. Exhaust manifold 148, emissions control device 178, exhaust gas sensor 126, and temperature sensors may be included in engine exhaust system 11.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. In this example, intake valve 150 may be controlled by controller 12 by cam actuation via cam actuation system 152, including one or more cams 151. Similarly, exhaust valve 156 may be controlled by controller 12 via cam actuation system 154, including one or more cams 153. The position of intake valve 150 and exhaust valve 156 may be determined by valve position sensors (not shown) and/or camshaft position sensors 155 and 157, respectively.

During some conditions, controller 12 may vary the signals provided to cam actuation systems 152 and 154 to control the opening and closing of the respective intake and exhaust valves. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. In alternative examples, intake valve 150 and/or exhaust valve 156 may be controlled by electric valve actuation. For example, cylinder 14 may alternatively include an intake valve controlled via electric valve actuation and an exhaust valve controlled via cam actuation, including CPS and/or VCT systems. In other examples, the intake and exhaust valves may be controlled by a common valve actuator (or actuation system) or a variable valve timing actuator (or actuation system).

As further described herein, intake valve 150 and exhaust valve 156 may be deactivated during VDE mode via electrically actuated rocker arm mechanisms. In another example, intake valve 150 and exhaust valve 156 may be deactivated via a CPS mechanism in which a cam lobe with no lift is used for deactivated valves. Still other valve deactivation mechanisms may also be used, such as for electrically actuated valves. In one example, deactivation of intake valve 150 may be controlled by a first VDE actuator (e.g., a first electrically actuated rocker arm mechanism, coupled to intake valve 150) while deactivation of exhaust valve 156 may be controlled by a second VDE actuator (e.g., a second electrically actuated rocker arm mechanism, coupled to exhaust valve 156). In alternate examples, a single VDE actuator may control deactivation of both intake and exhaust valves of the cylinder. In still other examples, a single cylinder valve actuator deactivates a plurality of cylinders (both intake and exhaust valves), such as all of the cylinders in an engine bank, or a distinct actuator may control deactivation for all of the intake valves while another distinct actuator controls deactivation for all of the exhaust valves of the deactivated cylinders. It will be appreciated that if the cylinder is a non-deactivatable cylinder of the VDE engine, then the cylinder may not have any valve deactivating actuators. Each engine cylinder may include the valve control mechanisms described herein. Intake and exhaust valves are held in closed positions over one or more engine cycles when deactivated so as to prevent flow into or out of cylinder 14.

Cylinder 14 can have a compression ratio, which is a ratio of volumes when piston 138 is at bottom dead center (BDC) to top dead center (TDC). In one example, the compression ratio is in the range of 9:1 to 22:1, depending on whether engine 10 is configured as a gasoline or diesel engine. The compression ratio may also be increased if direct injection is used due to its effect on engine knock.

Each cylinder of engine 10 may include a spark plug 192 for initiating combustion when the engine is configured to combust gasoline or petrol. However, spark plug 192 may be omitted when engine 10 is configured to combust diesel fuel. An ignition system 190 can provide an ignition spark to combustion chamber 14 via spark plug 192 in response to a spark advance signal from controller 12, under select operating modes. Spark timing may be adjusted based on engine operating conditions and driver torque demand. For example, spark may be provided at minimum spark advance for best torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a direct fuel injector 166 and a port fuel injector 66. Fuel injectors 166 and 66 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal received from controller 12. Port fuel injector 66 may be controlled by controller 12 in a similar way. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injectors 166 and 66 from a fuel tank of fuel system 8 via fuel pumps and fuel rails. Further, the fuel tank may have a pressure transducer providing a signal to controller 12.

Fuel injectors 166 and 66 may be configured to receive different fuels from fuel system 8 in varying relative amounts as a fuel mixture and further configured to inject this fuel mixture directly into cylinder. For example, fuel injector 166 may receive alcohol fuel and fuel injector 66 may receive gasoline. Further, fuel may be delivered to cylinder 14 during different strokes of a single cycle of the cylinder. For example, directly injected fuel may be delivered at least partially during a previous exhaust stroke, during an intake stroke, and/or during a compression stroke. Port injected fuel may be injected after intake valve closing of a previous cycle of the cylinder receiving fuel and up until intake valve closing of the present cylinder cycle. As such, for a single combustion event (e.g., combustion of fuel in the cylinder via spark ignition or compression ignition), one or multiple injections of fuel may be performed per cycle via either or both injectors. The multiple DI injections may be performed during the compression stroke, intake stroke, or any appropriate combination thereof in what is referred to as split fuel injection.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; a catalyst inlet temperature from a temperature sensor 158 coupled to exhaust passage 135; a catalyst temperature from temperature sensor 159; a crankshaft position signal from a Hall effect sensor 120 (or other type) coupled to crankshaft 140; throttle position from a throttle position sensor 163; signal UEGO from exhaust gas sensor 126, which may be used by controller 12 to determine the air-fuel ratio of the exhaust gas; engine vibrations via sensor 90; and an absolute manifold pressure signal (MAP) from a MAP sensor 124. An engine speed signal, RPM, may be generated by controller 12 from crankshaft position. The manifold pressure signal MAP from MAP sensor 124 may be used to provide an indication of vacuum or pressure in the intake manifold. Controller 12 may infer an engine temperature based on the engine coolant temperature.

Controller 12 receives signals from the various sensors of FIG. 1 and employs the various actuators of FIG. 1 to adjust engine operation based on the received signals and instructions stored on a memory of the controller. For example, the controller may transition the engine to operating in VDE mode by actuating valve actuators 152 and 154 to deactivate selected cylinders. In addition, controller 12 may receive input from and provide data to human/machine interface 115. In one example, human/machine interface 115 may be a touch screen device, a display and keyboard, a phone, or other known device.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

During selected conditions, such as when the full torque capability of engine 10 is not requested, one of a first or a second cylinder group may be selected for deactivation by controller 12 (herein also referred to as a VDE mode of operation). During the VDE mode, cylinders of the selected group of cylinders may be deactivated by shutting off respective fuel injectors 166 and 66. Further, valves 150 and 156 may be deactivated and held closed over one or more entire engine cycles. While fuel injectors of the disabled cylinders are turned off, the remaining enabled cylinders continue to carry out combustion, with corresponding fuel injectors and intake and exhaust valves active and operating. To meet torque requirements, the controller adjusts the amount of air entering active engine cylinders. Thus, to provide equivalent engine torque that an eight cylinder engine produces at 0.2 engine load and a particular engine speed, the active engine cylinders may operate at higher pressures than engine cylinders when the engine is operated with all engine cylinders being active. This requires higher manifold pressures, resulting in lowered pumping losses and increased engine efficiency. Additionally, the lower effective surface area (from only the active cylinders) exposed to combustion reduces engine heat losses, increasing the thermal efficiency of the engine.

Referring now to FIG. 2, a detailed view of a cooling system 200 for engine 10 is shown. Engine 10 is coupled to engine coolant pump 204 via conduit or passage 250. Engine coolant pump 204 is coupled to thermostat valve 202 via conduit or passage 252. Thermostat valve 202 is coupled to radiator or heat exchanger 210 via conduit 254. Radiator 210 is coupled to engine 10 via conduit or passage 256.

In some examples, thermostat valve 202 may be commanded to an open state via controller 12. In other examples, thermostat valve 202 may open itself in response to a temperature of engine coolant. Coolant temperatures in engine coolant system 200 may be determined via sensors 260 and 262. In this example, sensor 260 senses temperature of coolant exiting engine 10. Sensor 262 senses temperature of coolant exiting radiator 210. In other examples, only a single temperature sensor may be provided.

Controller 12 may selectively activate engine coolant pump 204 to circulate coolant between radiator 210 and engine 10. Coolant passing through radiator 210 may be cooled by passing air through radiator 210 via fan 208. Fan 208 may be rotated via electric motor 206.

Thus, the system of FIGS. 1 and 2 provides for a system for diagnosing an engine coolant pump, comprising: an internal combustion engine including a coolant pump; and a controller including executable instructions stored in non-transitory memory that cause the controller to command the coolant pump to a first speed while the internal combustion engine is not rotating, command the coolant pump to a second speed while the internal combustion engine is not rotating, and compare output of a temperature sensor to an expected temperature response. The system further comprises additional instructions that cause the controller to activate engine cooling fans while the internal combustion engine is not rotating in response to a request to diagnose operation of the coolant pump. The system further comprises additional instructions to determine a time constant based on output of the temperature sensor. The system includes where the time constant is determined based on operating the coolant pump at the first speed. The system includes where the time constant is determined based on operating the coolant pump at the second speed. The system further comprises additional instructions to open a thermostat in response to a request to diagnose operation of the coolant pump. The system further comprises adjusting operation of a vehicle in response to an indication of coolant pump degradation. The system includes where adjusting operation of the vehicle includes increasing an operating range of a vehicle operating in an electric vehicle operating mode.

Figure 6:
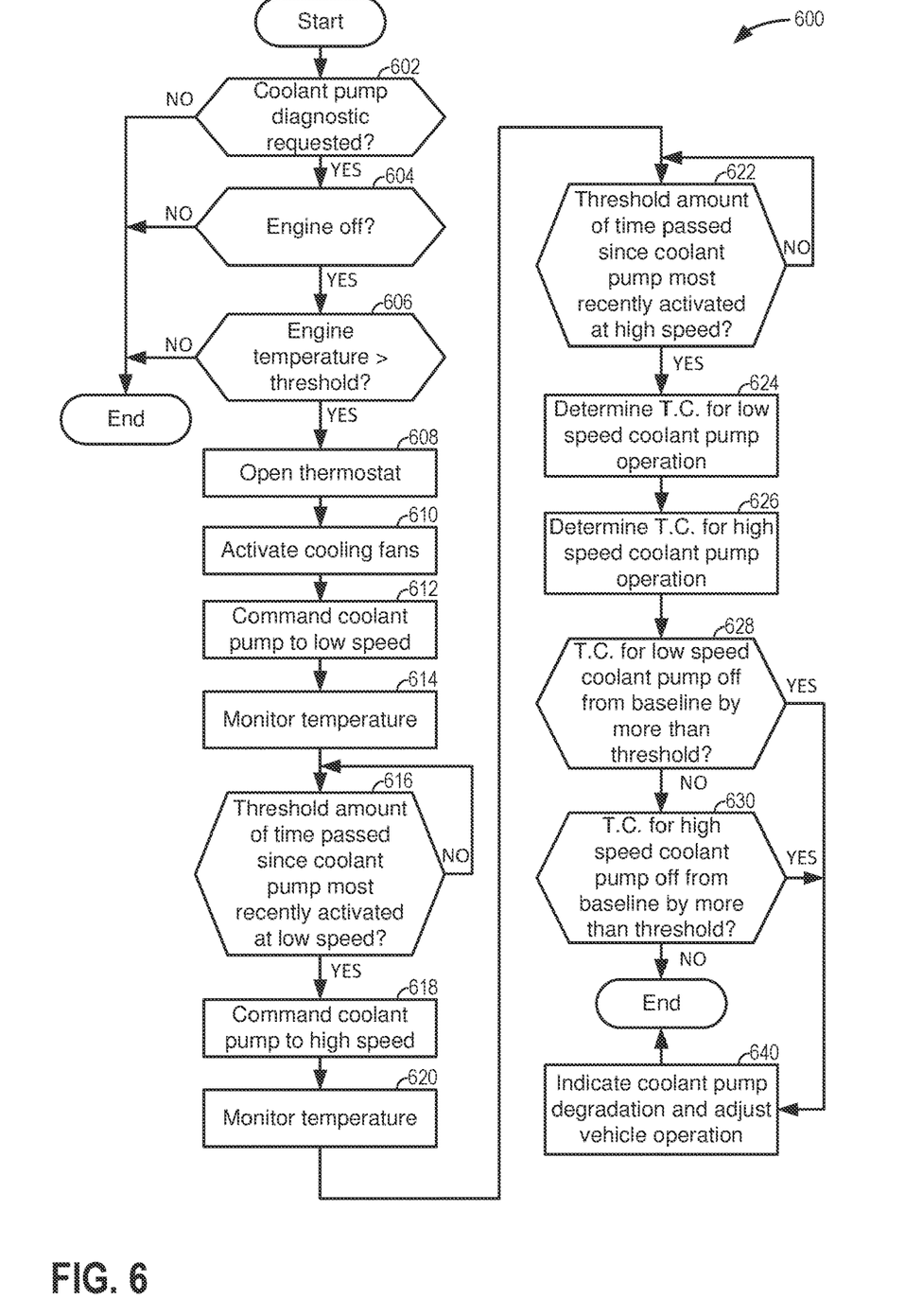
FIG. 6 shows a flow chart of a method for diagnosing operation of an engine coolant pump.

Referring now to FIG. 3, an example engine coolant pump diagnostic sequence according to the method of FIG. 6 is shown. The sequence of FIG. 3 may be provided by the system of FIGS. 1 and 2 in cooperation with the method of FIG. 6. The vertical lines at times t0-t5 represent times of interest in the sequence. This example sequence may be indicative of an engine coolant pump diagnostic sequence where the engine coolant pump operates as may be expected.

The first plot from the top of FIG. 3 is a plot of engine coolant temperature versus time. The vertical axis represents engine coolant temperature and engine coolant temperature increases in the direction of the vertical axis arrow. The horizontal axis represents time and time increases from the left side of the plot to the right side of the plot. Trace 302 represents engine coolant temperature.

The second plot from the top of FIG. 3 is a plot of commanded engine coolant pump flow versus time. The vertical axis represents the commanded engine coolant pump flow and the commanded engine coolant pump flow increases in the direction of the vertical axis arrow. The horizontal axis represents time and time increases from the left side of the figure to the right side of the figure. Trace 304 represents the commanded engine coolant pump flow.

At time t0, the engine coolant temperature is at a higher level and the commanded engine coolant pump flow is zero. The engine (not shown) is off (e.g., not rotating and not combusting fuel).

At time t1, a request to diagnose operation of an engine coolant pump is asserted (not shown) and the commanded engine coolant pump flow is increased to a lower level. At the same time, engine cooling fans (not shown) are activated so that the vehicle's radiator may extract heat from the engine coolant. The engine coolant temperature begins to decline.

At time t2, the engine coolant temperature has been reduced by 63.2% from its initial temperature value at time t1 for the time interval between time t1 and time t3. The amount of time between time t1 and time t2 is equal to one time constant for a first order system responding to the step change in engine coolant flow between time t1 and time t3. The engine coolant temperature continues to decline between time t2 and time t3.

At time t3, the commanded engine coolant pump flow is increased to a higher level. Thus, time t3 marks the end time between when the commanded engine coolant pump flow is increased to a low level and when the commanded engine coolant pump flow is no longer at a lower value. The commanded engine coolant pump flow increases and the increased engine coolant pump flow may allow heat to be extracted from the engine and the engine coolant at a higher rate.

At time t4, the engine coolant temperature has been reduced by 63.2% from its initial temperature value at time t3 for the time interval between time t3 and time t5. The amount of time between time t3 and time t4 is equal to one time constant for a first order system responding to the step change in engine coolant flow between time t3 and time t5. The engine coolant temperature continues to decline between time t4 and time t5.

At time t5, the commanded engine coolant pump flow is decreased to zero. Thus, time t5 marks the end time between when the commanded engine coolant pump flow is increased to a higher level and when the commanded engine coolant pump flow is commanded to zero.

In this way, engine coolant pump flow may be evaluated at low and high flow conditions without impacting engine operation or engine emissions. The engine coolant pump may be initially commanded to a low flow rate and then it may be commanded to a high flow rate to confirm that the engine coolant pump is operating as intended. In this example, the engine coolant pump responds as may be expected to low and high flow commands. The amount of time it takes to reduce engine coolant temperature 63.2% from an initial temperature (e.g., temperature at time t1) to a final temperature (e.g., temperature at time t3) may be referred to as one time constant for commanded low speed or flow engine coolant pump operation. The amount of time it takes to reduce engine coolant temperature 63.2% from an initial temperature (e.g., temperature at time t3) to a final temperature (e.g., temperature at time t5) may be referred to as one time constant for commanded high speed or flow engine coolant pump operation.

Referring now to FIG. 4, an example engine coolant pump diagnostic sequence according to the method of FIG. 6 is shown. The sequence of FIG. 4 may be provided by the system of FIGS. 1 and 2 in cooperation with the method of FIG. 6. The vertical lines at times t10-t15 represent times of interest in the sequence. This example sequence may be indicative of an engine coolant pump diagnostic sequence where the engine coolant pump responds to a low flow command, but does not respond to a high flow command.

The first plot from the top of FIG. 4 is a plot of engine coolant temperature versus time. The vertical axis represents engine coolant temperature and engine coolant temperature increases in the direction of the vertical axis arrow. The horizontal axis represents time and time increases from the left side of the plot to the right side of the plot. Trace 402 represents engine coolant temperature.

The second plot from the top of FIG. 4 is a plot of commanded engine coolant pump flow versus time. The vertical axis represents the commanded engine coolant pump flow and the commanded engine coolant pump flow increases in the direction of the vertical axis arrow. The horizontal axis represents time and time increases from the left side of the figure to the right side of the figure. Trace 404 represents the commanded engine coolant pump flow.

At time t10, the engine coolant temperature is at a higher level and the commanded engine coolant pump flow is zero. The engine (not shown) is off (e.g., not rotating and not combusting fuel).

At time t11, a request to diagnose operation of an engine coolant pump is asserted (not shown) and the commanded engine coolant pump flow is increased to a lower level. At the same time, engine cooling fans (not shown) are activated so that the vehicle's radiator may extract heat from the engine coolant. The engine coolant temperature begins to decline.

At time t12, the engine coolant temperature has been reduced by 63.2% from its initial temperature value at time t11 for the time interval between time t11 and time t13. The amount of time between time t11 and time t12 is equal to one time constant for the step change in engine coolant flow between time t11 and time t13. The engine coolant temperature continues to decline between time t12 and time t13.

At time t13, the commanded engine coolant pump flow is increased to a higher level, but the engine coolant pump flow remains at the lower flow level. Thus, time t13 marks the end time between when the commanded engine coolant pump flow is increased to a low level and when the commanded engine coolant pump flow is no longer at a lower value. The actual engine coolant flow does not increase with the commanded engine coolant pump flow increase. Therefore, the rate of change in engine coolant temperature carries on and it does not increase as may be expected if the engine coolant flow followed the commanded engine coolant flow.

At time t14, the engine coolant temperature has been reduced by 63.2% from its initial value at time t13 for the time interval between time t13 and time t15. The amount of time between time t13 and time t14 is equal to one time constant for the step change in commanded engine coolant flow between time t13 and time t15. However, there is a noticeable change in the time constant as compared to the time constant observed in FIG. 3 and in the reduced drop in engine coolant temperature.

At time t15, the commanded engine coolant pump flow is decreased to zero. Thus, time t15 marks the end time between when the commanded engine coolant pump flow is increased to a higher level and when the commanded engine coolant pump flow is commanded to zero.

In this way, it may be possible to observe when an engine coolant flow does not follow a commanded engine coolant flow. In particular, a lack of a drop in engine coolant temperature may be indicative of a lack of an increase in engine coolant flow. In addition, it may be observed that the amount of time it takes engine coolant temperature to change 63.2% between an initial temperature and a final temperature may be significantly changed. The change in a time constant value from a based time constant may be indicative of an engine coolant pump not responding to a high commanded engine coolant flow.

Referring now to FIG. 5, an example engine coolant pump diagnostic sequence according to the method of FIG. 6 is shown. The sequence of FIG. 5 may be provided by the system of FIGS. 1 and 2 in cooperation with the method of FIG. 6. The vertical lines at times t20-t25 represent times of interest in the sequence. This example sequence may be indicative of an engine coolant pump diagnostic sequence where the engine coolant pump is stuck in a high flow mode when it is activated.

The first plot from the top of FIG. 5 is a plot of engine coolant temperature versus time. The vertical axis represents engine coolant temperature and engine coolant temperature increases in the direction of the vertical axis arrow. The horizontal axis represents time and time increases from the left side of the plot to the right side of the plot. Trace 502 represents engine coolant temperature.

The second plot from the top of FIG. 5 is a plot of commanded engine coolant pump flow versus time. The vertical axis represents the commanded engine coolant pump flow and the commanded engine coolant pump flow increases in the direction of the vertical axis arrow. The horizontal axis represents time and time increases from the left side of the figure to the right side of the figure. Trace 504 represents the commanded engine coolant pump flow.

At time t20, the engine coolant temperature is at a higher level and the commanded engine coolant pump flow is zero. The engine (not shown) is off (e.g., not rotating and not combusting fuel).

At time t21, a request to diagnose operation of an engine coolant pump is asserted (not shown) and the commanded engine coolant pump flow is increased to a lower level. At the same time, engine cooling fans (not shown) are activated so that the vehicle's radiator may extract heat from the engine coolant. The engine coolant temperature begins to decline.

At time t22, the engine coolant temperature has been reduced by 63.2% from its initial temperature value at time t21 for the time interval between time t21 and time t23. The amount of time between time t21 and time t22 is equal to one time constant for the step change in engine coolant flow between time t21 and time t23. The engine coolant temperature continues to decline between time t22 and time t23. The engine coolant temperature falls at a higher rate between time t21 and time t23 because the engine coolant pump is stuck in a high flow state.

At time t23, the commanded engine coolant pump flow is increased to a higher level, but the engine coolant pump flow remains at the higher flow level. Thus, time t23 marks the end time between when the commanded engine coolant pump flow is increased to a low level and when the commanded engine coolant pump flow is no longer at a lower value. The actual engine coolant flow does not increase with the commanded engine coolant pump flow increase. Therefore, the rate of change in engine coolant temperature carries on and it does not increase as may be expected if the engine coolant flow followed the commanded engine coolant flow.

At time t24, the engine coolant temperature has been reduced by 63.2% from its initial value at time t23 for the time interval between time t23 and time t25. The amount of time between time t23 and time t24 is equal to one time constant for the step change in commanded engine coolant flow between time t23 and time t25. However, there is a noticeable change in the time constant as compared to the time constant observed in FIG. 3 and in the reduced drop in engine coolant temperature.

At time t25, the commanded engine coolant pump flow is decreased to zero. Thus, time t25 marks the end time between when the commanded engine coolant pump flow is increased to a higher level and when the commanded engine coolant pump flow is commanded to zero.

In this way, it may be possible to observe when an engine coolant flow does not follow a commanded low engine coolant flow command. Specifically, a higher temperature drop may be indicative of an engine coolant pump that is stuck in a high flow mode. In addition, it may be observed that the amount of time it takes engine coolant temperature to change 63.2% between an initial temperature and a final temperature may be significantly changed. The change in a time constant value from a base value may be indicative of an engine coolant pump not responding to a commanded low engine coolant flow.

Referring now to FIG. 6, a method for diagnosing operation of an engine coolant pump is shown. Method 600 may be included in and may cooperate with the system of FIGS. 1 and 2. At least portions of method 600 may be incorporated in the system of FIGS. 1 and 2 as executable instructions stored in non-transitory memory. In addition, other portions of method 600 may be performed via a controller transforming operating states of devices and actuators in the physical world. The controller may employ actuators and sensors described herein to adjust engine coolant pump operation. Further, method 600 may determine selected control parameters from sensor inputs.

At 602, method 600 judges if an engine coolant pump diagnostic has been requested. An engine coolant pump diagnostic may be requested at fixed time intervals (e.g., every 100 hours of vehicle service), at fixed distance intervals (e.g., every 5000 miles a vehicle is driven), or in response to operator or remote server requests. If method 600 judges that an engine coolant pump diagnostic has been requested, the answer is yes and method 600 proceeds to 604. Otherwise, the answer is no and method 600 exits.

At 604, method 600 judges if the vehicle's engine is off (e.g., not rotating and not combusting fuel). In one example, method 600 may judge that the engine is off based on output of an engine position sensor and the operating states of engine fuel injectors. If method 600 judges that the engine is off or stopped, the answer is yes and method 600 proceeds to 604. Otherwise, the answer is no and method 600 proceeds to exit.

At 606, method 600 judges if engine temperature is greater than a threshold temperature (e.g., 100 degrees Celsius). If so, the answer is yes and method 600 proceeds to 608. Otherwise, the answer is no and method 600 proceeds to exit. The engine coolant pump speed may be commanded to zero speed before step 608 to reduce engine cooling before the diagnostic begins.

At 608, method 600 may open a thermostat valve via a controller if the vehicle includes a thermostat that may be opened via a controller. If the system does not include a thermostat that may be opened via a controller, method 600 may not proceed to 608 if the engine's temperature is less than a temperature at which the thermostat is open. Method 600 proceeds to 610 after the thermostat is open.

At 610, method 600 activates engine cooling fans (e.g., 206 and 208 of FIG. 2) to remove heat from engine coolant. The engine cooling fans may be commanded to a constant speed. Method 600 proceeds to 612.

At 612, method 600 commands the engine coolant pump (e.g., 204 of FIG. 2) to a non-zero low flow rate (e.g., 25% of a maximum flow rate or speed of the engine coolant pump). The engine coolant pump is commanded to a low flow rate to verify that the engine coolant pump is operating and to verify that it is not stuck at a high flow rate output. Method 600 proceeds to 614.

At 614, method 600 monitors a temperature of the engine, or alternatively, an engine coolant temperature. Method 600 monitors the temperature to verify that operating the engine coolant pump cools the engine in an expected way. Method 600 stores temperatures and times that the temperatures where determined in controller random access memory. Method 600 proceeds to 616.

At 616, method 600 judges if a threshold amount of time has passed since the engine coolant pump was most recently commanded to a the low flow rate. If so, the answer is yes and method 600 proceeds to 618. Otherwise, the answer is no and method 600 returns to 616.

At 618, method 600 commands the engine coolant pump to a high speed (e.g., greater than 75% of a maximum engine coolant pump flow rate or speed). By commanding the engine coolant pump to the high speed, it may be possible to verify whether or not the engine coolant pump is operating as may be expected. Method 600 proceeds to 620.

At 620, method 600 monitors a temperature of the engine, or alternatively, an engine coolant temperature. Method 600 monitors the temperature to verify that operating the engine coolant pump cools the engine in an expected way (e.g., the engine is cooled faster as compared to if the coolant pump is commanded to a lower speed). Method 600 stores temperatures and times that the temperatures where determined in controller random access memory. Method 600 proceeds to 622.

At 622, method 600 judges if a threshold amount of time has passed since the engine coolant pump was most recently commanded to the higher flow rate. If so, the answer is yes and method 600 proceeds to 624. Otherwise, the answer is no and method 600 returns to 622. In addition, method 600 may command the engine coolant pump to zero speed when the answer is yes.

At 624, method 600 determines a time constant for low speed engine coolant pump operation. In one example, method determines the time constant by reviewing the engine or engine coolant temperature that was monitored at step 614. In particular, engine temperature or engine coolant temperature is determined at the time immediately before the time when the engine coolant pump is commanded to the low speed at step 612. This is temperature T1. In addition, engine temperature or engine coolant temperature is determined at a time immediately before the time when the engine coolant pump is commanded to the high speed at step 618. This is temperature T2. Method 600 determines a temperature that represents a 63.2% drop in temperature between temperature T1 and temperature T2 via the following equation: T63L=T1−0.632(T1−T2), where T63L is the temperature that represents a 63.2% drop in temperature from temperature T1 when the engine coolant pump is commanded to a low speed. Method 600 then references temperature data and the times that the engine and/or engine coolant temperatures were determined to determine a time that the engine temperature or engine coolant temperature was equal to the value of temperature T63L. The time difference between when the first temperature was determined at 614 and the time that the engine temperature or engine coolant temperature was equal to T63L may be referred to as the time constant for low speed engine coolant pump operation. FIGS. 3-5 depict how the time constant may be determined. Method 600 proceeds to 626.

At 626, method 600 determines a time constant for high speed engine coolant pump operation. In one example, method determines the time constant by reviewing the engine or engine coolant temperature that was monitored at step 620. In particular, engine temperature or engine coolant temperature is determined at the time immediately before the time when the engine coolant pump is commanded to the high speed at step 618. This is temperature T3. In addition, engine temperature or engine coolant temperature is determined at a time immediately before the time when the engine coolant pump is commanded to the zero speed at step 622. This is temperature T4. Method 600 determines a temperature that represents a 63.2% drop in temperature between temperature T3 and temperature T4 via the following equation: T63H=T3−0.632(T3−T4), where T63H is the temperature that represents a 63.2% drop in temperature from temperature T3. Method 600 then references temperature data and the times that the engine and/or engine coolant temperatures were determined to determine a time that the engine temperature or engine coolant temperature was equal to the value of temperature T63H. The time difference between when the third temperature was determined at 620 and the time that the engine temperature or engine coolant temperature was equal to T63H may be referred to as the time constant for high speed engine coolant pump operation. FIGS. 3-5 depict how the time constant may be determined. Method 600 proceeds to 628.

At 628, method 600 judges if the value of the time constant determined at 624 is greater or less than a low speed base time constant by more than a predetermined amount, then the answer is yes and method 600 proceeds to 640. Otherwise, the answer is no and method 600 proceeds to 630. For example, if the low speed based time constant for low speed engine coolant pump operation is 2 minutes and the predetermined amount is 10% or 12 seconds, then method 600 may proceed to 640 if the time constant determined at 624 is less than 108 seconds or greater than 212 seconds. The low speed base time constant for low speed engine coolant pump operation may be stored in controller memory and it may represent an expected engine cooling system temperature response and/or an engine coolant pump temperature response. The time constant determined at 624, or alternatively, the low speed base time constant may be adjusted according to ambient air temperature.

Alternatively, method 600 may judge if an amount of time it takes for engine temperature or engine coolant temperature to reach a predetermined temperature when the engine coolant pump is commanded to a low speed is greater or less than a predetermined amount of time by more than a predetermined amount, then the answer is yes and method 600 proceeds to 640. Otherwise, the answer is no and method 600 proceeds to 630. For example, if the time it takes to reach a predetermined engine or engine coolant temperature is 4 minutes and the predetermined amount is 10% or 24 seconds, then method 600 may proceed to 640 if the time determined is less than 216 seconds or greater than 264 seconds. The time for the engine or engine coolant temperature to drop to the threshold temperature may be stored in controller memory. The time may be adjusted according to ambient air temperature.

At 630, method 600 judges if the value of the time constant determined at 626 is greater or less than a high speed base time constant by more than a predetermined amount, then the answer is yes and method 600 proceeds to 640. Otherwise, the answer is no and method 600 proceeds to exit. For example, if the high speed based time constant for high speed engine coolant pump operation is 1 minute and the predetermined amount is 10% or 6 seconds, then method 600 may proceed to 640 if the time constant determined at 624 is less than 54 seconds or greater than 66 seconds. The high speed base time constant for high speed engine coolant pump operation may be stored in controller memory. The time constant determined at 626, or alternatively, the high speed base time constant may be adjusted according to ambient air temperature.

Alternatively, method 600 may judge if an amount of time it takes for engine temperature or engine coolant temperature to reach a predetermined temperature when the engine coolant pump is commanded to a high speed is greater or less than a predetermined amount of time by more than a predetermined amount, then the answer is yes and method 600 proceeds to 640. Otherwise, the answer is no and method 600 proceeds to exit.

At 640, method 600 indicates engine coolant pump degradation (e.g., an inability to flow engine coolant at a desired rate). Method 600 may also adjust vehicle operation in response to an indication of engine coolant pump degradation. For example, method 600 may operate an electric machine as a vehicle propulsion source over a wider range of vehicle operating conditions so that the engine may be operated less frequently. Thus, if the engine coolant pump is operating as may be expected, the engine may be started for driver demand values that are greater than 150 Newton-meters. However, if the engine coolant pump is determined to be degraded, the engine may be started for driver demand values that are greater than 200 Newton-meters. In addition, or alternatively, method 600 may shut the engine down sooner when the engine is operated at low temperatures if the engine coolant pump is stuck in a high speed mode. Method 600 proceeds to exit.

In this way, method 600 may determine whether or not an engine coolant pump may be operating as may be expected. In addition, method 600 may assess engine coolant pump operation under conditions that may not affect engine emissions or vehicle drivability.

Thus, the method of FIG. 6 provides for a method for diagnosing operation of an engine coolant pump, comprising: rotating the engine coolant pump at a first speed via a controller in response to an engine not rotating; monitoring output of a temperature sensor while operating the engine coolant pump at the first speed; and comparing output of the temperature sensor to a predetermined temperature response. The method further comprises providing an indication of engine coolant pump degradation in response to output of the temperature sensor deviating from the predetermined temperature response by more than a threshold amount. The method further comprises opening a thermostat valve in response to the engine not rotating. The method further comprises determining a time constant of a temperature response based on output of the temperature sensor. The method includes where the predetermined temperature response is a first time constant, and where comparing output of the temperature sensor to the predetermined temperature response includes determining a second time constant from output of the temperature sensor and comparing the first time constant to the second time constant. The method further comprises activating an engine cooling fan in response to the engine not rotating. The method includes where the engine coolant pump is rotated in further response to a temperature of an engine exceeding a threshold temperature.

The method of FIG. 4 also provides for a method for diagnosing operation of an engine coolant pump, comprising: rotating the engine coolant pump at a first speed and a second speed via a controller in response to an engine not rotating; monitoring output of a temperature sensor while operating the engine coolant pump at the first speed and the second speed; and comparing output of the temperature sensor to a first predetermined temperature response and a second predetermined temperature response. The method includes where the first predetermined temperature response is represented by a first time constant. The method includes where the second predetermined temperature response is represented by a second time constant. The method further comprises opening a thermostat valve in response to the engine not rotating. The method further comprises indicating degradation of the engine coolant pump in response to comparing output of the temperature sensor to the first predetermined temperature response and the second predetermined temperature response.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for diagnosing operation of an engine coolant pump, comprising:
rotating the engine coolant pump at a first speed via a controller in response to an engine not rotating;
monitoring output of a temperature sensor while operating the engine coolant pump at the first speed;
comparing output of the temperature sensor to a predetermined temperature response; and
activating an engine cooling fan in response to the engine not rotating.

2. The method of claim 1, further comprising providing an indication of engine coolant pump degradation in response to output of the temperature sensor deviating from the predetermined temperature response by more than a threshold amount.

3. The method of claim 1, further comprising opening a thermostat valve in response to the engine not rotating.

4. The method of claim 1, further comprising determining a time constant of a temperature response based on output of the temperature sensor.

5. The method of claim 1, where the predetermined temperature response is a first time constant, and where comparing output of the temperature sensor to the predetermined temperature response includes determining a second time constant from output of the temperature sensor and comparing the first time constant to the second time constant.

6. The method of claim 1, where the engine coolant pump is rotated in further response to a temperature of an engine exceeding a threshold temperature.

7. A system for diagnosing an engine coolant pump, comprising:
an internal combustion engine including a coolant pump; and
a controller including executable instructions stored in non-transitory memory that cause the controller to command the coolant pump to a first speed while the internal combustion engine is not rotating, command the coolant pump to a second speed while the internal combustion engine is not rotating, and compare output of a temperature sensor to an expected temperature response.

8. The system of claim 7, further comprising additional instructions that cause the controller to activate engine cooling fans while the internal combustion engine is not rotating in response to a request to diagnose operation of the coolant pump.

9. The system of claim 8, further comprising additional instructions to determine a time constant based on output of the temperature sensor.

10. The system of claim 9, where the time constant is determined based on operating the coolant pump at the first speed.

11. The system of claim 9, where the time constant is determined based on operating the coolant pump at the second speed.

12. The system of claim 7, further comprising additional instructions to open a thermostat in response to a request to diagnose operation of the coolant pump.

13. The system of claim 7, further comprising adjusting operation of a vehicle in response to an indication of coolant pump degradation.

14. The system of claim 13, where adjusting operation of the vehicle includes increasing an operating range of a vehicle operating in an electric vehicle operating mode.

15. A method for diagnosing operation of an engine coolant pump, comprising:

rotating the engine coolant pump at a first speed and a second speed via a controller in response to an engine not rotating;

monitoring output of a temperature sensor while operating the engine coolant pump at the first speed and the second speed; and comparing output of the temperature sensor to a first predetermined temperature response and a second predetermined temperature response.

16. The method of claim 15, where the first predetermined temperature response is represented by a first time constant.

17. The method of claim 16, where the second predetermined temperature response is represented by a second time constant.

18. The method of claim 15, further comprising opening a thermostat valve in response to the engine not rotating.

19. The method of claim 15, further comprising indicating degradation of the engine coolant pump in response to comparing output of the temperature sensor to the first predetermined temperature response and the second predetermined temperature response.

* * * * *